(12) United States Patent
Averbuch et al.

(10) Patent No.: US 11,935,385 B1
(45) Date of Patent: Mar. 19, 2024

(54) ANOMALY DETECTION USING DICTIONARY BASED PROJECTION

(71) Applicant: ThetaRay Ltd, Hod HaSharon (IL)

(72) Inventors: Amir Averbuch, Tel Aviv (IL); Amit Bermanis, Toronto (CA); David Segev, Lapid (IL)

(73) Assignee: ThetaRay Ltd., Hod HaSharon (IL)

( * ) Notice: Subject to any disclaimer, the term of this patent is extended or adjusted under 35 U.S.C. 154(b) by 0 days.

(21) Appl. No.: 17/378,713

(22) Filed: Jul. 18, 2021

Related U.S. Application Data

(60) Provisional application No. 63/061,492, filed on Aug. 5, 2020.

(51) Int. Cl.
*G06F 21/55* (2013.01)
*G08B 21/18* (2006.01)

(52) U.S. Cl.
CPC ............. *G08B 21/18* (2013.01); *G06F 21/55* (2013.01)

(58) Field of Classification Search
None
See application file for complete search history.

(56) References Cited

U.S. PATENT DOCUMENTS

| | | | | |
|---|---|---|---|---|
| 8,355,998 B1* | 1/2013 | Averbuch | ............. | G06F 16/285 706/12 |
| 9,032,521 B2 | 5/2015 | Amini et al. | | |
| 9,942,254 B1* | 4/2018 | Averbuch | ............. | H04L 63/145 |
| 10,148,680 B1* | 12/2018 | Segev | ................. | H04L 63/1425 |
| 2016/0342677 A1* | 11/2016 | Nuchia | ................. | G06F 16/285 |
| 2017/0091240 A1* | 3/2017 | Yu | ........................ | G06F 16/2237 |
| 2020/0151603 A1* | 5/2020 | Chen | ........................ | G06F 17/16 |
| 2020/0314127 A1* | 10/2020 | Wilson | ................ | H04L 63/1416 |
| 2020/0358799 A1* | 11/2020 | Boyer | ..................... | H04L 63/14 |
| 2021/0295180 A1* | 9/2021 | Neumann | ................ | G06N 3/08 |

OTHER PUBLICATIONS

Sterling. "How to Use Transition Matrices". Finite Math for Dummies. Updated Jul. 30, 2018. URL Link: < https://www.dummies.com/article/business-careers-money/business/accounting/calculation-analysis/use-transition-matrices-254821/ >. Accessed Sep. 17, 2022. (Year: 2018).*

(Continued)

*Primary Examiner* — Irene Baker
(74) *Attorney, Agent, or Firm* — Nathan & Associates; Menachem Nathan

(57) ABSTRACT

Methods for anomaly detection using dictionary based projection (DBP), and system for implementing such methods. In an embodiment, a method comprises receiving input data including a plurality n of multidimensional data points (MDDPs) with dimension m, applying DBP iteratively to the input data to construct a dictionary D, receiving a newly arrived MDDP (NAMDDP), calculating a score S associated with the NAMDDP as a distance of the NAMDDP from dictionary D, and classifying the NAMDDP as normal or as an anomaly based on score S, wherein classification of the NAMDDP as an anomaly is indicative of detection of an unknown undesirable event.

18 Claims, 5 Drawing Sheets

(56) References Cited

OTHER PUBLICATIONS

Saidé et al., "Dictionary adaptation for online prediction of time series data with kernels," 2012 IEEE Statistical Signal Processing Workshop (SSP), 2012, pp. 604-607, doi: 10.1109/SSP.2012.6319772. URL Link: < https://ieeexplore.ieee.org/document/6319772>. Accessed Jul. 2023. (Year: 2012).*
Phonphitakchai et al. "Stochastic Meta Descent in online kernel methods". 2009 6th Int'l Conference on EE/Electronics, Computer, Telecommunications and IT, 2009, p. 690-693. doi: 10.1109/ECTICON.2009.5137142. URL Link: <https://ieeexplore.ieee.org/abstract/document/5137142>. Accessed Jul. 2023. (Year: 2009).*
Godfrey et al. "Maximal Vector Computation in Large Data Sets". Proceedings of the 31st VLDB Conference, 2005, p. 229-240. URL Link: <https://www.vldb.org/archives/website/2005/program/paper/tue/p229-godfrey.pdf >. Accessed Oct. 2023. (Year: 2005).*
R.R. Coifman, S. Lafon, Diffusion Maps, Applied and Computational Harmonic Analysis, 21(1), pp. 5-30, 2006.
W. B. Johnson and J. Lindenstrauss, "Extensions of Lipshitz mapping into Hilbert space",vol. 26 of Contemporary Mathematics, Amer. Math. Soc.,pp. 189-206. 1984.
W. H. Press, S. A. Teukolsky, W T. Vetterling, B. P. Flannery, Numerical Recipes in C: The Art of Scientific Computing, Second Edition, Cambridge University Press, pp. 791-794. 1992.
A. Bermanis, A. Averbuch, R. Coifman, Multiscale data samplinng and function extension, Applied and Computtaional Harmonic Analysis, 34, pp. 15-29. 2013.
R. Coifman, S. Lafon, Geometric Harmonics: A novel tool for multiscale out-of-sample extension of empirical functions, Applied and Computational Harmonic Analysis, 21(1):pp. 31-52,2006.
Dempster, A., Laird, N., Rubin, D.: Maximum Likelihood from Incomplete Data via the EM Algorithm. Journal of the Royal Statistical Society 39(1) pp. 1-38. 1977.
Gil Shabat, Yaniv Shmueli, Yariv Aizenbud, Amir Averbuch; "Randomized LU Decomposition"Preprint submitted to Applied and Computational Harmonic Analysis, pp. 1-39. 2015.
G. H. Golub, C. F. Van Loan, "Matrix Computations", 4th Edition, John Hopkins (p. 130).2012.

* cited by examiner

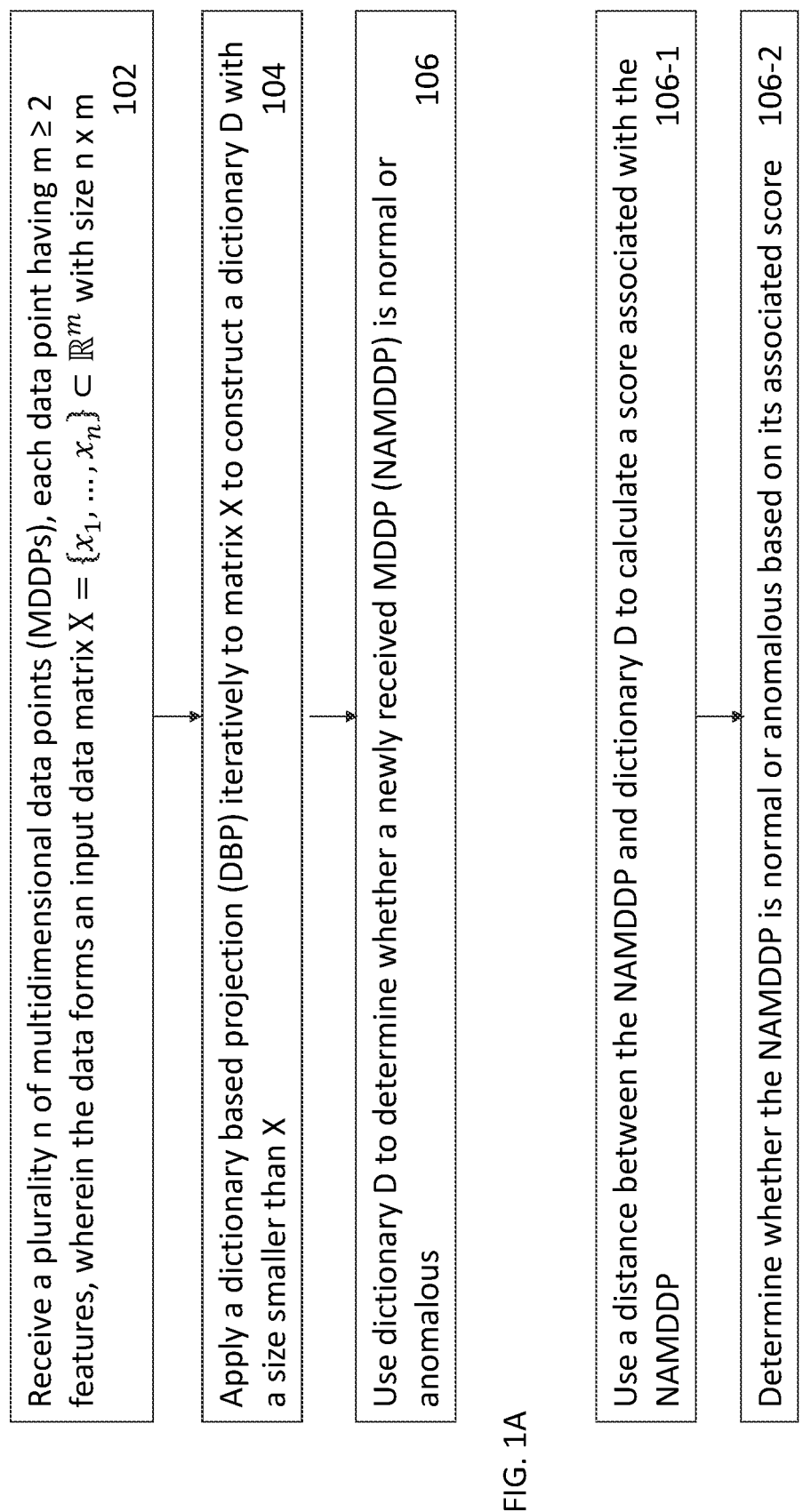

ANOMALY DETECTION USING DICTIONARY BASED PROJECTION

CROSS REFERENCE TO RELATED APPLICATIONS

This application is related to and claims priority from U.S. provisional patent application No. 63/061,492 filed Aug. 5, 2020, which is incorporated herein by reference in its entirety.

FIELD

Embodiments disclosed herein relate in general to methods and systems for anomaly detection of anomalies in data, and in particular to detection of anomalies among unknown multidimensional data points (MDDPs) in an unsupervised way.

BACKGROUND

Huge amounts of data are generated by many sources. "Data" refers to a collection of information, the result of experience, observation, measurement, streaming, computing, sensing or experiment, other information within a computer system, or a set of premises that may consist of numbers, characters, images, or as measurements of observations.

Static and dynamic "high dimensional big data" (HDBD) are common in a variety of fields. Exemplarily, such fields include finance, energy, medical, transportation, communication networking (i.e. protocols such as TCP/IP, UDP, HTTP, HTTPS, ICMP, SMTP, DNS, FTPS, SCADA, wireless and Wi-Fi) and streaming, process control and predictive analytics, social networking, imaging, e-mails, governmental databases, industrial data, healthcare and aviation. HDBD is a collection of multi-dimensional data points (MDDPs). A MDDP, also referred to as "data sample", "sampled data", "data point", "vector of observations", "vector of transactions" or "vector of measurements", is one unit of data from the original (source, raw) HDBD. A MDDP may be expressed as a combination of numeric, Boolean, integer, floating, binary or real characters. HDBD datasets (or databases) include MDDPs that may be either static or may accumulate constantly (dynamic). MDDPs may include (or may be described by) hundreds or thousands of parameters (or "features").

The terms "parameter" or "feature" refer to an individual measurable property of phenomena being observed. A feature may also be "computed", i.e. be an aggregation of different features to derive an average, a median, a standard deviation, etc. "Feature" is also normally used to denote a piece of information relevant for solving a computational task related to a certain application. More specifically, "features" may refer to specific structures ranging from simple structures to more complex structures such as objects. The feature concept is very general and the choice of features in a particular application may be highly dependent on the specific problem at hand. Features can be described in numerical (3.14), Boolean (yes, no), ordinal (never, sometimes, always), or categorical (A, B, O) manner.

Various methods for detection of anomalies among unknown multidimensional data points (MDDPs) in an unsupervised way are known. However, the demand for such methods remains high, and new, improved methods are constantly sought. In particular, it is desirable to have automatic and unsupervised anomaly detection methods and associated systems characterized by not having or using domain expertise, signatures, rules, patterns or semantics understanding of all the available features.

SUMMARY

Embodiments disclosed herein relate to detection of anomalies (abnormalities) among MDDPs using dictionaries constructed by dictionary based projection (DBP). As used herein, "the term "DBP" is defined by Algorithm 1 below. A detected anomaly may be indicative of an undesirable event that deviates from data spanned by elements in a constructed dictionary. The elements in the constructed dictionary represent data points of interest that can be used to analyze high dimensional big data in a fast way.

In this description, an "undesirable event" indicated by an anomaly or by an "abnormal MDDP" may for example be any of (but not limited to): a cyber-threat, a cyber-attack, an operational malfunction, an operational breakdown, a process malfunction, a process breakdown, a financial risk event, a financial threat event, a financial fraud event or a financial network intrusion event.

In exemplary embodiments, there is/are provided a method or methods for detection of anomalies in HDBD indicative of undesirable events that are unknown before the application of the method or methods (referred to as "unknown undesirable events"), and systems for implementing such methods.

In exemplary embodiments, there is/are disclosed a method or methods, comprising: receiving input data including a plurality n of multidimensional data points (MDDPs), each MDDP having m≥2 features, wherein the data forms a matrix $X=\{x_1, \ldots, x_n\} \subset \mathbb{R}^m$ with size n×m; applying a dictionary based projection (DBP) iteratively to the input data to construct a dictionary D with a size smaller than X; and using dictionary D to determine whether a newly arrived MDDP (NAMDDP) is normal or is an anomaly, whereby the use of dictionary D instead of matrix X to determine whether the NAMDDP is normal or an anomaly reduces computational requirements for anomaly detection.

In an exemplary embodiment, there is disclosed a computer program product, comprising: a non-transitory tangible storage medium readable by a processing circuit and storing instructions for execution by the processing circuit for performing a method comprising: receiving input data including a plurality n of multidimensional data points (MDDPs), each MDDP having m≥2 features, wherein the data forms a matrix $X=\{x_1, \ldots, x_n\} \subset \mathbb{R}^m$ with size n×m; applying a dictionary based projection (DBP) iteratively to the input data to construct a dictionary D with a size smaller than X; and using dictionary D to determine whether a newly arrived MDDP (NAMDDP) is normal or is an anomaly, whereby the use of dictionary D instead of matrix X to determine whether the NAMDDP is normal or an anomaly reduces computational requirements for anomaly detection.

In an exemplary embodiment, there is disclosed a computer system, comprising: a hardware processor configurable to perform a method comprising: receiving input data including a plurality n of multidimensional data points (MDDPs), each MDDP having m≥2 features, wherein the data forms a matrix $X=\{x_1, \ldots, x_n\} \subset \mathbb{R}^m$ with size n×m; applying a dictionary based projection (DBP) iteratively to the input data to construct a dictionary D with a size smaller than X; and using dictionary D to determine whether a newly arrived MDDP (NAMDDP) is normal or is an anomaly, whereby the use of dictionary D instead of matrix X to determine whether the NAMDDP is normal or an anomaly reduces computational requirements for anomaly detection.

In some embodiments, the using of dictionary D to determine whether a NAMDDP is normal or is an anomaly includes calculating a score S associated with the NAMDDP as a distance of the NAMDDP from dictionary D, and classifying the NAMDDP as normal or as an anomaly based on the score S, wherein classification of the NAMDDP as an anomaly is indicative of detection of an unknown undesirable event.

In some embodiments, the applying the DBP iteratively to the input data to construct dictionary D includes using a Gaussian kernel as an input to a kernel dictionary based projection (KDBP), wherein the Gaussian kernel is an affinity matrix A of size p×p defined on the input data and wherein p≤n, to construct dictionary D.

In some embodiments, a method may further comprise, if the NAMDDP is classified as an anomaly, triggering an alarm.

In some embodiments, a method may further comprise, if the NAMDDP is classified as an anomaly, sending a notification to a user or a data client system.

In some embodiments, for p<n, the building of the Gaussian kernel from the input data includes building the Gaussian kernel from a subset $Y=\{y_1, \ldots, y_p\}$ of the input data.

In this description, an "undesirable event" indicated by an anomaly or by an "abnormal MDDP" or "abnormal new MDDP (NAMDDP)" may for example be any of (but not limited to): a cyber-threat, a cyber-attack, malware presence, an operational malfunction, an operational breakdown, a process malfunction, a process breakdown, a medical event, a financial risk event, a financial threat event, a financial fraud event or a financial network intrusion event.

An anomaly detection method and associated system disclosed herein is characterized by not having or using domain expertise, signatures, rules, patterns or semantics understanding of all the available features. It is automatic and unsupervised.

BRIEF DESCRIPTION OF THE DRAWINGS

For simplicity and clarity of illustration, elements shown in drawings are not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 1A shows in a flow chart a general flow of an embodiment of a method for anomaly detection using a dictionary as disclosed herein;

FIG. 1B shows details of the anomaly detection step in the method of FIG. 1A;

DETAILED DESCRIPTION

Methods disclosed herein are now described with reference to FIGS. 1-3.

FIG. 1A shows in a flow chart a general flow of an embodiment of a method for anomaly detection using a dictionary as disclosed herein. A raw data (also referred to as "input data") set X including a plurality n of multidimensional data points (MDDPs), each MDDP having m≥2 features is received in step 102. Raw data $X=\{x_1, \ldots, x_n\} \subset \mathbb{R}^m$ can be viewed as a matrix (set of vectors) of size n×m where n (rows of the matrix) is the number of MDDPs and m (columns of the matrix) is the number of features in (i.e. the dimension of) each MDDP. A DBP is applied iteratively to data from matrix X to construct a dictionary D in step 104. When a newly arrived MDDP (NAMDDP) is received, dictionary D is used to determine whether it is normal or abnormal (anomalous) in step 106.

Details of how dictionary D make the determination in step 106 are given in FIG. 1B. In a sub-step 106-1, D and a distance between the NAMDDP and dictionary D are used to calculate a score associated with the NAMDDP. The NAMDDP is determined to be normal or abnormal (anomalous) based on its associated score in a sub-step 106-2.

Figure 1C:
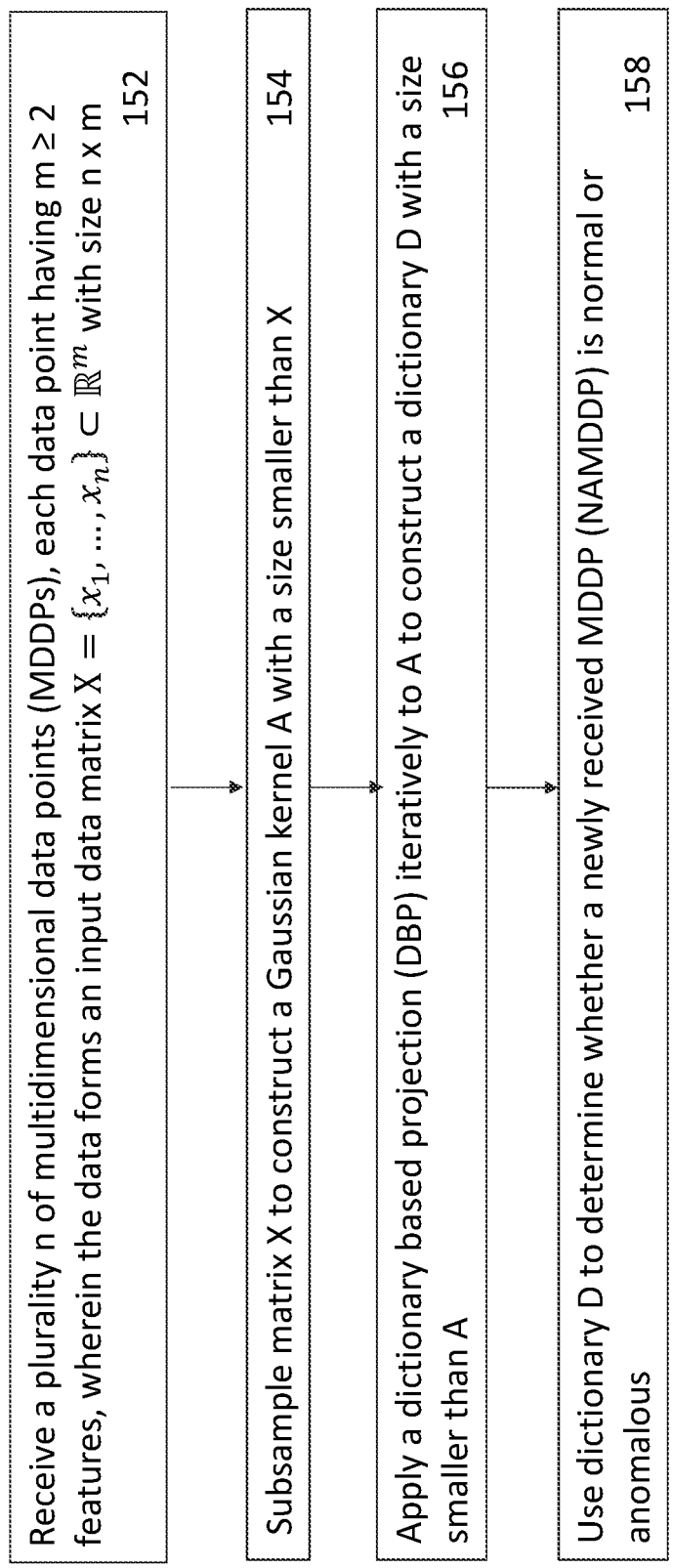
FIG. 1C shows in a flow chart a general flow of another embodiment of a method for anomaly detection using a dictionary as disclosed herein.

FIG. 1C shows in a flow chart a general flow of another embodiment of a method for anomaly detection using a dictionary as disclosed herein. As in FIG. 1A raw data in the form $X=\{x_1, \ldots, x_n\} \subset \mathbb{R}^m$ is received in step 152. The raw data is then subsampled to construct a Gaussian kernel A with a size smaller than X in step 154. DBP is the applied iteratively to A to construct a dictionary D in step 156. When a newly arrived MDDP (NAMDDP) is received, dictionary D is used to determine whether it is normal or abnormal (anomalous) in step 158.

In some embodiments and optionally, the detection of an anomaly may trigger an alarm. In some embodiments and optionally, the detection of an anomaly may be followed by a notification (for example sent through output mechanism(s) 426 as part of output data 422 in FIG. 4A) provided to a user or a data client system such as system 424 in FIG. 4A. In response to the notification, the user to the data client system may, optionally, perform additional actions to prevent an undesirable event associated with the detected anomaly from causing damage to the computer system, to a system from which the raw data was received or is associated with, or to other systems.

Algorithm 1—Dictionary Based Projection

Figure 2:
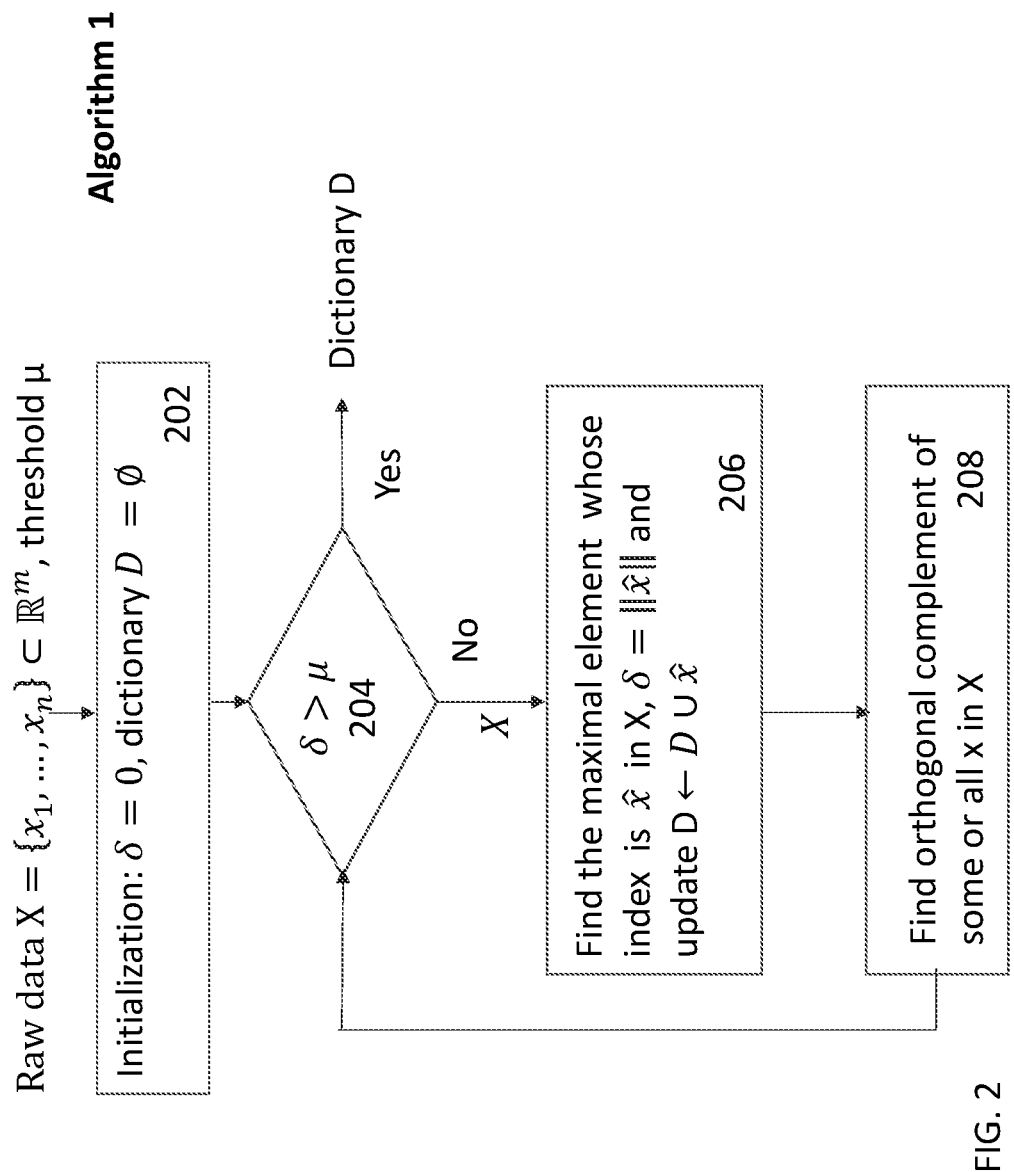
FIG. 2 shows a block diagram illustrating the creation of a dictionary from raw data using Algorithm 1.

FIG. 2 shows in a flow chart details of Algorithm 1. The input is raw data $X=\{x_1, \ldots, x_n\} \subset \mathbb{R}^m$ and a threshold $\mu \geq 0$. Algorithm 1 outputs a dictionary $D \subset X$ such that $\|P_D(x)-x\| \leq \mu$ for all $x \in X$ where $P_D$ is the orthogonal projection over the subspace spanned by the elements of D. In more detail:

In step 202, the following are initialized: dictionary D=∅, δ=0, (where δ is a number that keeps track of the size of the online dictionary construction).

In step 204, a check δ>μ is run, and if Yes, the construction of dictionary D is completed. If No in step 204, the maximal vector element $\hat{x}$ in $X=\{x_1, \ldots, x_n\} \subset \mathbb{R}^m$ such that $\hat{x}=\arg\max_{x \in X}\|x\|$, $\delta=\|\hat{x}\|$ is found, dictionary D is updated, $D \leftarrow D \cap \hat{x}$ by adding $\hat{x}$ to D, $D=D \cap \{\hat{x}\}$ in step 206, an orthogonal complement of all elements x in X $x \leftarrow x-P_D(x)$ is found for each $x \in X$ in step 208, and the process returns to step 204.

Algorithm 2

Algorithm 2 acts on a Gaussian kernel (also referred to as "affinity matrix") A whose entries are $a_{ij}=\exp\{-\|x_i-x_j\|^2/\varepsilon\}$ for some $\varepsilon > 0$ (304 in FIG. 3), where s is the size of a localized neighborhood. Columns of A with large $L_2$ norms are associated with central data points, i.e. points in the centers of local high density areas. Moreover, dominant pairwise orthogonal columns are associated with distant (relatively to ε) central data points.

The kernel DBP data analysis framework comprises two phases: train and detect. In some embodiments, in the train, a dictionary is built by applying the DBP algorithm (Algorithm 1) to a randomly or uniformly sampled subset of X, $Y=\{y_1, \ldots, y_p\}$, p<n designated to reduce the computational load. Subsampling also called downsampling and subsampled is a method that reduces data size by selecting a subset of the original data. Uniform or random subsampling of the data indices preserves the main structure of the data. Once a dictionary is formed, the detection phase is applied, and anomaly scores are computed as distances from the dictionary. Algorithm 2 (FIG. 3) summarizes the above.

Figure 3:
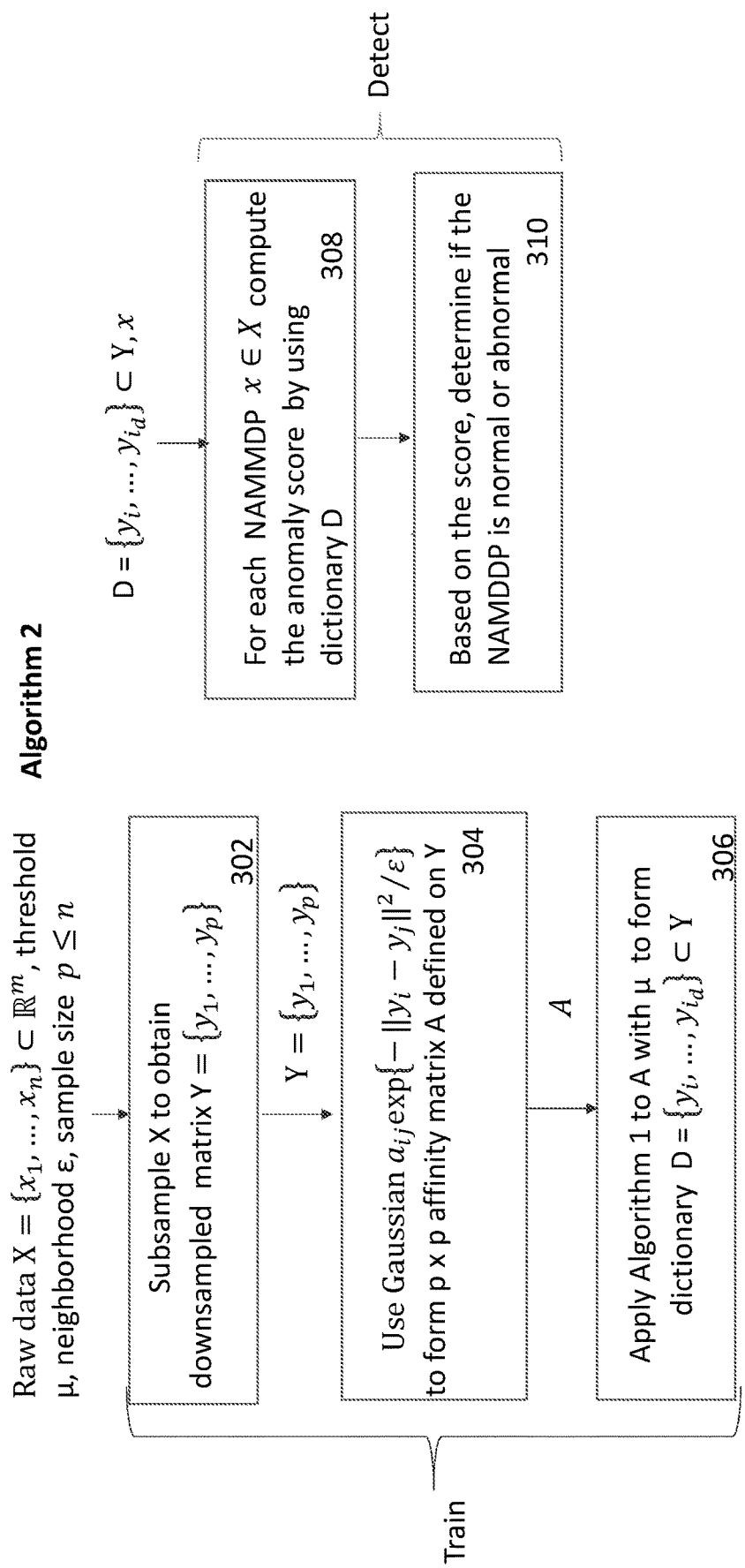
FIG. 3 shows in a flow chart details of Algorithm 2.

FIG. 3 shows in a flow chart details of Algorithm 2. The input is raw data $X=\{x_1, \ldots, x_n\} \subset \mathbb{R}^m$, neighborhood of constant ε>0, threshold μ>0, downsampling size p, p≤n (if p=n there is no subsampling). The output of Algorithm 2 is dictionary D∈X and abnormality scores function S:X→R.

Train:

X is downsampled uniformly or randomly to obtain a subset $Y=\{y_1, \ldots, y_p\}$ in step 302. In the particular case of p=n, there is no subsampling and the subsampled data is of the same size as the raw data. Gaussian kernel (affinity matrix A) of size p×p of multiscale affinities between elements $a_{ij}$ of matrix A defined on Y such that $a_{ij}=\exp\{-\|y_i-y_j\|^2/\varepsilon\}$, i, j=1, ..., p is created in step 304. e, the size of a localized neighborhood, is determined for example for each data point $y_i$ or is given. Algorithm 1 is then applied with p to A to obtain dictionary D in step 306.

Detect:

An anomaly score S is calculated for each NAMDDP x∈X as the scaled distance of the NAMDDP from dictionary D. In step 308. That is, $S(x_i)=\min_{j=1,\ldots,d}\|x_i-y_{ij}\|$, i=1, ..., n. Score S is then used in step 310 to detect an anomaly by running the following check: if $S(x_i)<\mu$ then x∈X is normal otherwise it is abnormal (anomaly).

The use of a dictionary constructed as disclosed herein enables efficient processing of HDBD in the detection phase. The dictionary identifies a small set of informative representatives in the input data and thus span efficiently the entire dataset. The use of a dictionary speeds up significantly the operation of a computer and reduces significantly the computation time needed to identify an anomaly in the HDBD (and therefore an undesirable, potentially dangerous event related to the anomaly), in comparison with known anomaly detection methods. In addition, the dictionary reduces memory consumption.

The following examples illustrate the advantages of anomaly detection using a dictionary as disclosed herein in terms of accuracy, false alarms numbers and computer performance. Because the anomaly detection is achieved using a dictionary and not directly original (raw or subsampled) data, the smaller size of the dictionary vs. the original data allows faster processing with fewer computing resources.

Example 1—Building a Dictionary from Raw Data

Assume that the raw data X has 30000 MDDPs. A Gaussian kernel A of size 30000×30000 is constructed. A dictionary D is built from A. The dictionary size depends on the threshold μ in Algorithm 1. For example, the dictionary size in MDDPs is 10,040 when μ=0.2, 5,650 when μ=2, 2,750 when μ=10 and 1,240 when μ=20. One can see that D can be much smaller than X, depending on the chosen μ. The different sizes of D in these examples are all smaller (by between a factor of about 3 to about 25) than the size the raw data set.

Example 2—Building a Dictionary from Subsampled Data

The original (raw) data is first subsampled. Then, the dictionary is built from the subsampled data to further reduce the dataset size. For example, 3000 MDDPs are uniformly subsampled from 30000 MDDPs (subsample size p=10, step 302 in FIG. 3). Then, a Gaussian kernel A is of size 3000×3000 is constructed instead of a Gaussian kernel of size 30000×30000. A dictionary D is built from A. The size of D (in MDDPs) depends on threshold μ in Algorithm 1. For example, when μ=0.2, the size of D is 1,246 MDDPs, when μ=2 the size of D is 752, when μ=10 the size of D is 382 and when μ=20 the size of D is 190 MDDPs. The different sizes of D in these examples are all smaller than the size 3000 of the subsampled data set (here by factors of ca. 2.4 to 15.7).

In conclusion, for the training, the size of a dictionary disclosed herein is smaller than that of the subsampled data and much smaller than that of the raw data. Therefore and very clearly, the computation of the anomaly score using a dictionary disclosed herein will require less computational power and/or be much faster.

Example 3—Detection

An example for unsupervised computation of the detection quality of anomalies using a dictionary as built above is demonstrated on a DARPA dataset from *DARPA PI Meeting, Vol.* 15, 1998. The DARPA dataset contains raw data of size n=12,618 MDDPs where the number of features in each MDDP is m=14. The size of the training data is 6422 MDDPs. 6196 MDDPs are used for detection (total 12,618 MDDPs). The training MDDPs (6422) MDDPs are divided into 5 days as described in the table below where each day contains the size of the data where detection took place.

| Train data | | Known labels | Results from detect | |
|---|---|---|---|---|
| Set | Size | # of labeled anomalies | Accuracy [%] | False alarms [%] |
| Monday | 1,321 | 1 | 100 | 0.68 |
| Tuesday | 1,140 | 53 | 100 | 0.53 |
| Wednesday | 1,321 | 16 | 100 | 0.08 |
| Thursday | 1,320 | 24 | 96 | 1.74 |
| Friday | 1,320 | 18 | 100 | 0.15 |

The performance of the anomaly detection is given in the table. "Accuracy" stands for the portion of detected anomalies out of labeled anomalies. "False alarms" stands for the portion of falsely detected anomalies out of the entire data.

Figure 4A:
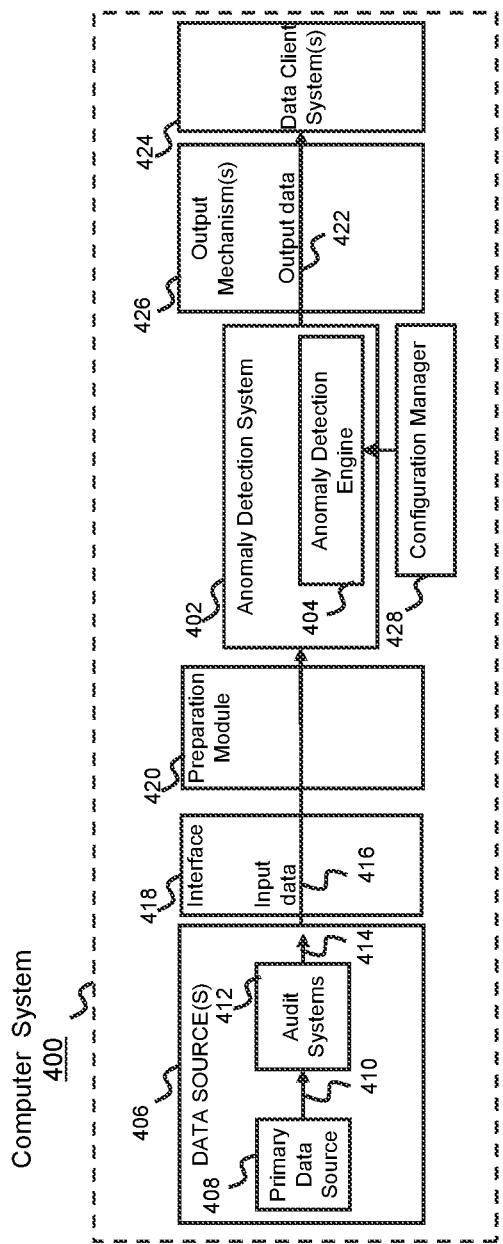
FIG. 4A shows a block diagram of a computer system operative to detect anomalies using dictionaries and methods disclosed herein, according to an exemplary embodiment.

Referring to FIG. 4A, a computer system 400 may comprise an anomaly detection system 402 which may be operative to detect anomalies in computer system 400, according to exemplary embodiments disclosed herein.

Methods, processes and/or operations for detecting anomalies may be implemented by an anomaly detection engine comprised in anomaly detection system 100. The term "engine" as used herein may also relate to and/or include a module and/or a computerized application. Detection engine 404 is configured to detect anomalies based on a method disclosed herein, i.e. a method that uses Algorithm 1 and Algorithm 2.

Data input to anomaly detection engine 404 may be of versatile structure and formats, and their volume and span (the number of parameters) can be theoretically unlimited.

Computer system 400 may include a variety of data sources 406 providing inputs (e.g., feature-based data) to anomaly detection engine 404. Non-limiting examples of data sources 406 may include networks, sensors, data warehouses and/or process control equipment, which may herein be referred to as "primary data sources" 408. Data provided by primary data sources 408 may comprise, for example, historian data, financial data, sensor data, network traffic data, online data, streaming data, databases, production data and/or the like, which may herein be collectively referred to as "source data" 410. In some embodiments, source data 410 may be input to risk systems, audit systems, security events managements systems and/or the like. These risk systems, audit systems, security events managements systems, etc., may herein be collectively referred to as "audit systems" 412, providing audited data 414. Audit systems 412 may comprise platforms and/or services developed by commercial vendors collecting security events data.

Input data 416 which may be input to anomaly detection system 402 may therefore include both source data 410 and/or audited data 414. In some embodiments, input data may not include audited data 414.

In an exemplary embodiment, input data 416 may be provided to detection engine 404 via one or more interfaces 418. An interface 418 may ingest input data by employing a variety of mechanisms including, for example, push/pull protocol (mechanism), in real time and/or in batches (historical data), over a variety of protocols and technologies. An interface 418 may for example comprise an input storage system, e.g., Hadoop Distributed File System (denoted hereinafter HDFS), SPLUNK, which is a commercial platform to perform Operational Intelligence, FILE TRANSFER, Micros service, Representational State Transfer—an architectural concept of live streaming (denoted hereinafter REST API), and more.

Input data 416 may be filtered by anomaly detection system 402, which may provide as output data 422 to one or more data client systems 424.

In some embodiments, output data 422 may be descriptive of analysis results, e.g., descriptive of anomaly events. In some embodiments, the output data may comprise filtered input data, i.e., input data which is free or substantially free of anomalies. In some embodiments, the output data may comprise an alarm or alarms. In some embodiments, the output data may comprise notifications about an anomaly or anomalies.

Data client systems 424 may include, for example, a multifunction mobile communication device also known as "smartphone", a personal computer, a laptop computer, a tablet computer, a server (which may relate to one or more servers or storage systems and/or services associated with a business or corporate entity, including for example, a file hosting service, cloud storage service, online file storage provider, peer-to-peer file storage or hosting service and/or a cyberlocker), customer databases, personal digital assistants, a workstation, a wearable device, a handheld computer, a notebook computer, a vehicular device, a stationary device, a controller, and/or a home appliances control system.

Output data 422 may be provided to data client systems 424 using a variety of output mechanisms 426 including, substantially in real time or periodically (e.g., in batches) over a variety of technologies and/or protocols, for example using a push/pull protocol. Non-limiting examples of technologies and/or protocols include Arcsite, which gathers and organizes graphic data, SPLUNK, FILE TRANSFER, HDFS, REST API, Comma Separated Variables (CSV) format, JSON, which is a platform for the development of multi-agent systems, and more.

In an exemplary embodiment, computer system 400 may comprise a configuration management module 428 which is operative to controllably and dynamically configure anomaly detection system 402, e.g., to optimize its results and/or provide judgmental qualitative and quantitative measures on its operation. Configuration management module 428 may allow configuring the operation and/or workflow of detection engine 404, as well as monitoring and control thereof. Configuration management module 428 may be operative to configure the operation and/or workflow of anomaly detection engine 404 automatically. Operation of configuration manager 428 may be invoked by anomaly detection engine 404, e.g., responsive to an event (e.g., an anomaly) detected by detection engine 404. While configuration management module 428 is schematically illustrated in FIG. 4A as external to anomaly detection system 402, this should by no means be construed limiting. In some embodiments, configuration management module 428 may be part of anomaly detection system 100.

Figure 4B:
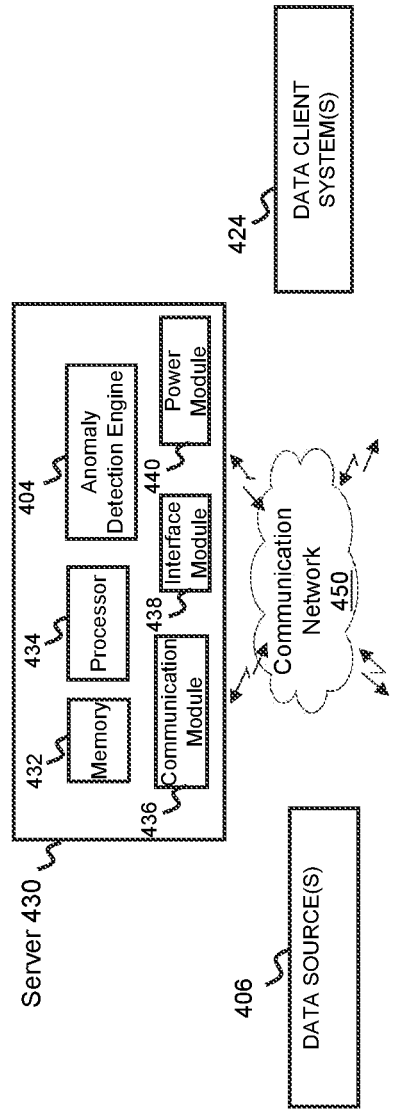
FIG. 4B shows in a block diagram details of components of the computer system of FIG. 4A.

Additionally referring to FIG. 4B, an anomaly detection system 402 may include or be implemented by a server 430 running anomaly detection engine 404. Server 430 may be in operable communication with data sources 406 and data client systems 424 over a communication network 450.

While anomaly detection system 402 and detection engine 404 are herein illustrated as being implemented by server 430, this should by no means be construed limiting. Accordingly, detection engine 404 may be implemented by any suitable device, fully or partially. For example, some implementations and/or portions and/or processes and/or elements and/or functions of detection engine 404 may be implemented by interface 418 and/or data client systems 424. Hence, in some embodiments, interface 418 and/or data client systems 424 for example may be considered be part of anomaly detection system 402.

Server 430 may refer, for example, to one or more servers or storage systems and/or services associated with a business or corporate entity, including for example, a file hosting service, cloud storage service, a hardware server, a virtual server, an online file storage provider, a peer-to-peer file storage or hosting service and/or a cyber locker. Server 430 may appear in various deployments models: cloud based, hardware server, or virtual.

Server 430 may include a database (not shown), a memory 432 configured to store data related to Algorithm 1 and Algorithm 2 and a processor 434 configured to run Algorithm 1 and Algorithm 2. Moreover, server 430 may include a communication module 436, a user interface module 438 and a power module 440 for powering the various components of server 430.

Memory 432 may include one or more types of computer-readable storage media including, for example, transactional memory and/or long-term storage memory facilities and may function as file storage, document storage, program storage, and/or as a working memory. The latter may, for example, be in the form of a static random access memory (SRAM), dynamic random access memory (DRAM), read-only memory (ROM), cache or flash memory. As long-term memory, memory 432 may, for example, include a volatile or non-volatile computer storage medium, a hard disk drive, a solid state drive, a magnetic storage medium, a flash memory and/or other storage facility. A hardware memory facility may, for example, store a fixed information set (e.g., software code) including, but not limited to, a file, program, application, source code, object code and the like.

Communication module 436 may, for example, include I/O device drivers (not shown) and network interface drivers (not shown) for enabling the transmission and/or reception of data over communication network 450. Communication module 436 may be used for communicating a notification or alarm related to a detected anomaly. A device driver may, for example, interface with a keypad or a USB port. A network interface driver may, for example, execute protocols for the Internet, or an Intranet, a Wide Area Network (WAN), a Local Area Network (LAN) employing, e.g., Wireless Local Area Network (WLAN)), a Metropolitan Area Network (MAN), a Personal Area Network (PAN), an Extranet, 2G, 3G, 3.5G, 4G including for example Mobile WIMAX or Long Term Evolution (LTE), Bluetooth©, Zig-Bee™, near-field communication (NFC) and/or any other current or future communication network, standard, and/or system.

The term "processor", as used herein, may additionally or alternatively refer to a controller. Processor 434 may be implemented by various types of processor devices and/or processor architectures including, for example, embedded processors, communication processors, graphics processing unit (GPU), soft-core processors and/or embedded processors.

Memory 432 may include instructions which, when executed e.g. by processor 434, may cause the execution of a method for detecting an anomaly. Merely to simplify the discussion that follows, methods and processes disclosed herein may herein be discussed in conjunction with detection engine 404. One or more hardware, software, and/or hybrid hardware/software modules may realize detection engine 404

Anomaly detection engine 404 may be operative to classify input data into normality or abnormality and to store, e.g., in memory 432, the analyzed input data as well as the computed dictionaries.

Reverting to FIG. 4A, computer system 400 may include, in some embodiments, a preparation module 420 (which may be implemented as a combination of software and hardware). In an exemplary embodiment, preparation module 420 may receive input data, select the significant features, enhance them as outlined in more detail herein below, and prepare the data for analysis. In an exemplary embodiment, the construction of dictionary D is done by preparation module 420.

In conclusion, embodiments disclosed herein provide a framework (methods and system) for finding anomalies captured by sensing/measuring/assembled logs, from streamed data and/or from a database. Raw data for example can also be aggregated and more computational features can be added. These features are derived by various computations on the raw data. Therefore, data referred to as "input data" can be either raw data or aggregated data or data that was enriched by adding computational features or combination of any of the above. In addition, "input data" may also include source data and/or audited data.

As described above, an anomaly detection system disclosed herein may include an anomaly detection engine configured and operative to implement the processes, procedures, methods and/or operations for detecting an anomaly described above. The term "engine" may comprise one or more computer modules, wherein a module may be a self-contained hardware and/or software component that interfaces with a larger system. A module may comprise machine executable instructions. A module may be embodied by a processing circuit or by a controller programmed to cause the system to implement the method, process and/or operation as disclosed herein. For example, a module may be implemented as a hardware circuit comprising, e.g., custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

While certain steps methods are outlined herein as being executed by a specific module and other steps by another module, this should by no means be construed limiting. For instance, in an exemplary embodiment, a detection module of the anomaly detection engine may execute one or more of the preparation steps outlined herein.

It should be understood that where the claims or specification refer to "a" or "an" element, such reference is not to be construed as there being only one of that element.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

While this disclosure describes a limited number of embodiments, it will be appreciated that many variations, modifications and other applications of such embodiments may be made. The disclosure is to be understood as not limited by the specific embodiments described herein, but only by the scope of the appended claims.

What is claimed is:

1. A method, comprising:
   a) receiving input data in a computer configured to detect anomalies, the input data including a plurality n of multidimensional data points (MDDPs), each MDDP having m≥2 features, and storing the data in a memory in a matrix X={$x_1, \ldots, x_n$} ⊂ $\mathbb{R}^m$ with size n×m;
   b) using an anomaly detection engine in the computer, applying, a dictionary based projection (DBP) iteratively to the input data to construct a dictionary D with a size smaller than X, wherein the DBP is associated with a preselected threshold μ≥0, wherein μ≥∥$P_D(x)-x$∥ where $P_D(x)$ is an orthogonal projection for all x∈X over a space spanned by D,
      wherein the applying the DBP iteratively to the input data to construct dictionary D includes using a Gaussian kernel as an input to a kernel dictionary based projection (KDBP) to construct dictionary D, wherein the Gaussian kernel is an affinity matrix A of size p×p defined on the input data and wherein p≤n,
      and wherein applying the DBP iteratively to the input data further comprises iteratively computing a maximal vector element $\hat{x}$=argmax$_{x \in X}$∥x∥ in X and setting a tracking number associated with a construction size of D, δ=∥$\hat{x}$∥;
   c) using the anomaly detection engine to apply the dictionary D to determine whether a newly arrived MDDP (NAMDDP) is normal or is an anomaly, whereby the use of dictionary D instead of matrix X to determine whether the NAMDDP is normal or an anomaly reduces computational requirements for anomaly detection; and, d) responsive to the anomaly detection engine detecting an anomaly, the computer performing any one of the following actions:
   i. invoking a management module to take an action associated with the operation of the engine, or
   ii. using a communication module, sending a notification to a user or to a data client system.

2. The method of claim 1, wherein the using of dictionary D to determine whether a NAMDDP is normal or is an anomaly includes calculating a score S associated with the NAMDDP as a distance of the NAMDDP from dictionary D, and classifying the NAMDDP as normal or as an anomaly based on the score S, wherein classification of the NAMDDP as an anomaly is indicative of detection of an unknown undesirable event.

3. The method of claim 1, further comprising, if the NAMDDP is classified as an anomaly, triggering an alarm.

4. The method of claim 3, wherein, for p<n, the Gaussian kernel is built from a subset $Y=\{y_1, \ldots, y_p\}$ of the input data.

5. A computer program product, comprising: a non-transitory tangible storage medium readable by a processing circuit and storing instructions for execution by the processing circuit for performing a method comprising:
   a) receiving input data in a computer configured to detect anomalies, the input data including a plurality n of multidimensional data points (MDDPs), each MDDP having m≥2 features, and storing the data in a memory in a matrix $X=\{x_1, \ldots, x_n\} \subset \mathbb{R}^m$ with size n×m;
   b) using an anomaly detection engine in the computer, applying a dictionary based projection (DBP) iteratively to the input data to construct a dictionary D with a size smaller than X, wherein the DBP is associated with a preselected threshold μ>0, wherein $\mu \geq \|P_D(x)-x\|$ where $P_D(x)$ is an orthogonal projection for all x∈X over a space spanned by D,
   wherein the applying the DBP iteratively to the input data to construct dictionary D includes using a Gaussian kernel as an input to a kernel dictionary based projection (KDBP) to construct dictionary D, wherein the Gaussian kernel is an affinity matrix A of size p×p defined on the input data and wherein p≤n,
   and wherein applying the DBP iteratively to the input data further comprises iteratively computing a maximal vector element $\hat{x}=\mathrm{argmax}_{x \in X}\|x\|$ in X, and setting a tracking number associated with a construction size of D, $\delta=\|\hat{x}\|$;
   c) using the anomaly detection engine to apply the dictionary D to determine whether a newly arrived MDDP (NAMDDP) is normal or is an anomaly, whereby the use of dictionary D instead of matrix X to determine whether the NAMDDP is normal or an anomaly reduces computational requirements for anomaly detection; and,
   d) responsive to the anomaly detection engine detecting an anomaly, the computer performing any one of the following actions:
      i. invoking a management module to take an action associated with the operation of the engine, or
      ii. using a communication module, sending a notification to a user or to a data client system.

6. The computer program product of claim 5, wherein the using of dictionary D to determine whether a NAMDDP is normal or is an anomaly includes calculating a score S associated with the NAMDDP as a distance of the NAMDDP from dictionary D, and classifying the NAMDDP as normal or as an anomaly based on the score S, wherein classification of the NAMDDP as an anomaly is indicative of detection of an unknown undesirable event.

7. The computer program product of claim 5, further comprising, if the NAMDDP is classified as an anomaly, triggering an alarm.

8. The computer program product of claim 5, wherein, for p<n, the Gaussian kernel is built from a subset $Y=\{y_1, \ldots, y_p\}$ of the input data.

9. A computer system, comprising: a hardware processor configurable to perform a method comprising:
   a) receiving input data including a plurality n of multidimensional data points (MDDPs), each MDDP having m≥2 features, and storing the data in a memory in a matrix $X=\{x_1, \ldots, x_n\} \subset \mathbb{R}^m$ with size n×m;
   b) using an anomaly detection engine, applying a dictionary based projection (DBP) iteratively to the input data to construct a dictionary D with a size smaller than X, wherein the DBP is associated with a preselected threshold μ>0, wherein $\mu \geq \|P_D(x)-x\|$ where $P_D(x)$ is an orthogonal projection for all x∈X over a space spanned by D,
   wherein the applying the DBP iteratively to the input data to construct dictionary D includes using a Gaussian kernel as an input to a kernel dictionary based projection (KDBP) to construct dictionary D, wherein the Gaussian kernel is an affinity matrix A of size p×p defined on the input data and wherein p≤n,
   and wherein applying the DBP iteratively to the input data further comprises iteratively computing a maximal vector element $\hat{x}=\mathrm{argmax}_{x \in X}\|x\|$ in X, and setting a tracking number associated with a construction size of D, $\delta=\|\hat{x}\|$;
   c) using the anomaly detection engine to apply the dictionary D to determine whether a newly arrived MDDP (NAMDDP) is normal or is an anomaly, whereby the use of dictionary D instead of matrix X to determine whether the NAMDDP is normal or an anomaly reduces computational requirements for anomaly detection; and,
   d) responsive to the anomaly detection engine detecting an anomaly, the computer performing any one of the following actions:
      i. invoking a management module to take an action associated with the operation of the engine, or
      ii. using a communication module, sending a notification to a user or to a data client system.

10. The computer system of claim 9, wherein the using of dictionary D to determine whether a NAMDDP is normal or is an anomaly includes calculating a score S associated with the NAMDDP as a distance of the NAMDDP from dictionary D, and classifying the NAMDDP as normal or as an anomaly based on the score S, wherein classification of the NAMDDP as an anomaly is indicative of detection of an unknown undesirable event.

11. The computer system of claim 9, further comprising, if the NAMDDP is classified as an anomaly, triggering an alarm.

12. The computer system of claim 9 wherein, for p<n, the Gaussian kernel is built from a subset $Y=\{y_1, \ldots, y_p\}$ of the input data.

13. The method of claim 1, further comprising updating D by the maximal vector element $\hat{x}$.

14. The method of claim 1, further comprising stopping the application of the DPB iterations when δ>μ.

15. The computer program product of claim 5, further comprising updating D by the maximal vector element $\hat{x}$.

16. The computer program product of claim 5, further comprising stopping the application of the DPB iterations when $\delta > \mu$.

17. The computer system of claim 9, further comprising updating D by the maximal vector element $\hat{x}$.

18. The computer system of claim 9, further comprising stopping the application of the DPB iterations when $\delta > \mu$.

\* \* \* \* \*